United States Patent
Sneed et al.

(10) Patent No.: US 7,246,266 B2
(45) Date of Patent: Jul. 17, 2007

(54) METHOD AND APPARATUS FOR FIRMWARE RESTORATION IN MODEMS

(76) Inventors: Chris Sneed, 14 Ghiberti, Irvine, CA (US) 92606-8875; Jay E. Gottlieb, 1930 Teresita La., Newport Beach, CA (US) 92660-4443; Alexander Grigoriev, 172 Murica Aisle, Irvine, CA (US) 92614; Liem U. To, 1881 Mitchell Ave. #42, Tustin, CA (US) 92780; Chi-Wen Chen, 16230 Bearcreek La., Cerritos, CA (US) 90703

( * ) Notice: Subject to any disclaimer, the term of this patent is extended or adjusted under 35 U.S.C. 154(b) by 524 days.

(21) Appl. No.: 10/303,317

(22) Filed: Nov. 21, 2002

(65) Prior Publication Data
US 2004/0103347 A1    May 27, 2004

(51) Int. Cl.
G06F 11/00 (2006.01)
(52) U.S. Cl. .............................. 714/27; 714/36; 714/44
(58) Field of Classification Search ................... 714/4, 714/36, 27, 44
See application file for complete search history.

(56) References Cited

U.S. PATENT DOCUMENTS

| | | | |
|---|---|---|---|
| 6,259,442 B1 * | 7/2001 | Britt et al. .................. 715/721 |
| 6,330,715 B1 * | 12/2001 | Razzaghe-Ashrafi ........ 717/171 |
| 6,357,021 B1 * | 3/2002 | Kitagawa et al. ............. 714/41 |
| 6,625,754 B1 * | 9/2003 | Aguilar et al. ................ 714/15 |
| 6,708,231 B1 * | 3/2004 | Kitagawa ..................... 710/10 |
| 6,757,837 B1 * | 6/2004 | Platt et al. ..................... 714/4 |
| 6,907,602 B2 * | 6/2005 | Tsai et al. ................... 717/168 |
| 7,093,244 B2 * | 8/2006 | Lajoie et al. ............... 717/168 |
| 2002/0114384 A1 * | 8/2002 | Nelson et al. .............. 375/222 |
| 2002/0147941 A1 * | 10/2002 | Gentile ........................ 714/36 |
| 2003/0088868 A1 * | 5/2003 | Chang et al. ............... 717/173 |
| 2003/0106051 A1 * | 6/2003 | Morrison et al. ........... 717/170 |
| 2003/0106052 A1 * | 6/2003 | Morrison et al. ........... 717/170 |
| 2003/0217358 A1 * | 11/2003 | Thurston et al. ............ 717/174 |
| 2004/0076043 A1 * | 4/2004 | Boals et al. ................. 365/200 |
| 2004/0103412 A1 * | 5/2004 | Rao et al. ................... 717/171 |

* cited by examiner

Primary Examiner—Marc Duncan
(74) Attorney, Agent, or Firm—Jack I Jmaev

(57) ABSTRACT

Corrupted firmware in a modem is automatically replaced. Replacement firmware is stored on a host computer. An update server executing on the host responds with firmware image in response to request from modem. Any interface port may be used to receive updated firmware, including a network interface.

8 Claims, 11 Drawing Sheets

METHOD AND APPARATUS FOR FIRMWARE RESTORATION IN MODEMS

FIELD OF THE INVENTION

This invention relates generally to customer premises equipment, i.e. access devices that may be used for connection to wide area networks.

BACKGROUND OF THE INVENTION

Internet service is ubiquitous in today's network-connected world. Most users of the Internet secure their access through a subscription arrangement with an Internet Service Provider (ISP). ISPs facilitate communication between subscribers and the greater Internet by offering various modes of connection to their subscribers. The ISP forwards subscribers' outgoing messages to the Internet proper through a high-speed backbone connection. Likewise, subscribers' incoming messages are received from the high-speed backbone and are relayed to individual subscribers. By so doing the relatively high cost of access to the Internet is shared among a large number of subscribers, thus making Internet access affordable to individual users.

ISPs communicate with their subscribers through various kinds of connections, the vast majority of which require the use of some kind of modem. Examples include voice-band dial-up modems, satellite modems, wireless modems, cable modems and, in a growing number of instances, Digital Subscriber Line (DSL) modems. Given that newer modem technology is relatively young when compared, for example, to voice-band dial-up modem technology, the expense of keeping up to date with the latest developments in modem technology can constitute a significant cost burden for ISPs. One method that modem manufacturers have developed to help to reduce this cost burden is to use non-volatile memory programmable modems. Non-volatile memory programmable technology permits a subscriber's modem to be upgraded by remote control without the need for customer or even manual intervention. Special capabilities in these programmable modems permit the modem operating firmware to be upgraded by means of special signals that can be initiated by the ISP and transmitted over the communications line that connects the subscriber to the ISP's facilities. When a programmable modem receives such a signal, it suspends normal operation and enters a mode whereby certain program code is stored in the modem's non-volatile program memory. In some cases, this may be flash memory or Electrically Erasable Programmable Read Only Memory (EEPROM). Once code is stored in non-volatile program memory, it is semi-permanent in that the state of the memory is maintained even when modem power is turned off.

The state of affairs just described does not tell the whole story, however. It is unfortunate that communication between ISPs and subscribers' modems cannot be guaranteed to be 100% reliable. In fact, errors are a normal part of life for modems in their normal operating mode, and modem designers have developed many innovative techniques that lower the probability of such errors and that mitigate their effects when they do occur. In spite of these innovations, however, the probability of error during modem communication can never be zero. Additionally, many other sources of disruption in the communication process are outside the control of modem designers. Some of these sources of disruption are lightning strikes, damage to telephone lines caused by traffic crashes, storm damage to telephone lines, loss of power at the subscriber's premises, and the like.

Therefore, while means exist for remotely reprogramming modems, the integrity of the process cannot be guaranteed, and means must be sought to cope with the result when the normal remote reprogramming process fails.

The problem is made especially difficult because of the chicken and egg nature of the whole process. Indeed, a subscriber's modem must have valid code on board in order to execute the instructions necessary to receive, process, and reload updated code being received from an ISP. However, given that non-volatile memory is relatively expensive it is normally necessary to erase all of the existing code stored in the memory before beginning the reprogramming process. During this interval, the firmware stored in the non-volatile memory is normally moved to random access memory (RAM). A microprocessor in the modem can then execute the firmware from the RAM image. If for some unhappy reason power to the modem is lost during the reprogramming process, the modem is left with no valid code with which to complete the process. Alternatively, if an error occurs in the sequence of many thousands of bits received by the subscriber's modem during reprogramming, the non-volatile memory will be programmed with invalid code, and the modem simply will not work.

The solution to this problem heretofore has been for the subscriber to return his modem to the manufacturer or dealer to have the unit reprogrammed. While manufacturers and ISPs may wish to believe that such situations occur only rarely, the loss of confidence both in the manufacturer and in the ISP on the part of the subscriber, not to mention the cost and general inconvenience to the subscriber, definitely are not good for business and should be avoided. What is needed is a way to recover from the catastrophic loss of firmware code stored in non-volatile memory that does not burden or inconvenience the subscriber.

SUMMARY OF THE INVENTION

A network connection device is any apparatus that may be used to connect network components together. For instance, a network connection device may comprise a modem, including, but not limited to dial-up modems, cable modems, digital subscriber line (DSL) modems, wireless modem and the like. Network connection devices (NCDs) often derive much of their functionality from firmware stored in non-volatile memory. Examples of non-volatile memory include, but should not be limited to flash memory and electrically-erasable programmable read-only-memory (EEPROM). This type of memory may be characterized as semi-permanent because its state does not change when power is removed from the memory module. If the firmware becomes corrupted for any reason, then an NCD normally would not be able to function.

The present invention comprises a method and apparatus for restoring the firmware in an NCD. The method provides for testing the integrity of the firmware and, if necessary, receiving a replacement image of the firmware from a host that communicates with the NCD. After the replacement firmware image is received, it may be loaded into semi-permanent memory with the result that the NCD may be able to then function normally. The invention also comprises an apparatus that embodies the method taught here.

One illustrative method of the present invention further provides for storing a replacement firmware image on a host. One variation of this method provides for installation of a firmware update server on the host. Once the host computer executes the firmware update server, it is enabled to respond to a request for a replacement firmware image. Such a request may be received from an NCD, if the NCD determines that the firmware image stored in its internal semi-permanent memory has been corrupted.

In order to determine if the firmware stored in the NCD's semi-permanent memory has been corrupted, one variation of the present method provides for calculating a check sum for the firmware. Once the check sum is calculated, it may be compared to a pre-established value. If the comparison is successful, it may be inferred that the firmware has not been corrupted. Otherwise, the firmware may be considered "corrupted".

The present method provides for receiving a new firmware image by way of an update port. Typically, this update port is communicatively connected to a host computer. The NCD may then send a request for a replacement firmware image to the host using the update port. This request may then be processed by a firmware update server that may be executing on the host computer. In response, the firmware update server may retrieve a replacement firmware image previously installed on the host. The replacement firmware image may then be directed to the NCD making the request.

According to one derivative method that illustrates yet another feature of the present invention, an NCD may be communicatively connected to a host computer by way of a network. Hence, using a local network interface, the NCD may discover a host that is communicatively attached to the network. Once the NCD discovers the host, it may then dispatch a request to a firmware update server that may be executing on the host computer. The firmware update server may then retrieve a replacement firmware image and direct this to the NCD by way of the network.

The present invention further comprises a network connection device. Said network connection device may comprise a firmware integrity checker, a firmware update unit and an execution unit. According to this embodiment of the invention, functional features exhibited by an NCD are typically defined by firmware stored in semi-permanent memory. When the NCD begins operating, the firmware integrity checker tests the integrity of the firmware stored in the semi-permanent memory. The firmware integrity checker may generate a firmware fault signal if it discovers that the firmware has been corrupted. According to one example embodiment, the firmware integrity checker may comprise a check sum computation unit and a comparison unit. In operation, the check sum computation unit may retrieve the firmware image from a semi-permanent memory and generate a check sum. The comparison unit may receive a pre-established check sum value that it may compare against the check sum generated by the check sum computation unit. The comparison unit may then generate a firmware fault signal if the comparison is unsuccessful.

The firmware update unit initiates replacement of the firmware image if it receives a firmware fault signal from the firmware integrity checker. Once the firmware update unit receives the replacement firmware image from a host, it may then store the replacement firmware image in the semi-permanent memory. Once the replacement firmware is stored in the semi-permanent memory, the execution unit may begin executing instructions comprising the firmware.

According to one alternative embodiment of the present invention, an NCD may further comprise a replacement firmware image installation unit. The replacement firmware image installation unit may store a replacement firmware image on a host. According to yet another alternative embodiment of the present invention, an NCD may further comprise an update server installation unit. The update server installation unit typically installs a firmware update server on a host. Once the update server is installed on a host, the server may be executed by the host computer; enabling the host to respond to a request for a replacement firmware image.

The NCD of the present invention may further comprise an update port. According to this alternative embodiment, the firmware update unit may comprise an update port controller and a memory access controller. When a firmware image needs to be replaced, the update port controller begins controlling the update port in order to dispatch a request for a replacement firmware image to a firmware update server. Typically, the firmware update server is executed by a host computer. The update port controller may then receive a replacement firmware image from the firmware update server. It may then convey this to the memory access controller, which may then store the replacement firmware image in the semi-permanent memory.

According to yet another illustrative embodiment of the present invention, an NCD may further comprise a network connection interface. In this case, the firmware update unit may comprise a network interrogation unit, a firmware update controller and a memory access controller. When a replacement firmware image is required, the network interrogation unit may search for a firmware update server that is communicatively connected to the NCD by way of the network connection interface. Typically, the firmware update server is executed on a host computer. If a firmware update server is found, a request for a new firmware image is dispatched to the discovered firmware update server. The memory access controller may then receive the replacement firmware image and store this in semi-permanent memory.

According to one alternative example embodiment of the present invention, an NCD may comprise a processor that executes instruction sequences, permanent memory for storing instruction sequences, semi-permanent memory for storing firmware and a firmware verification instruction sequence stored in the permanent memory. When the NCD according to this alternative embodiment begins operation, the execution unit may execute the firmware verification instruction sequence that may minimally cause the processor to test the integrity of firmware stored in the semi-permanent memory and receive the replacement firmware image from a host if the firmware is found in the corrupted. Once the fidelity of the firmware is established, the execution unit may then begin executing the firmware.

According to yet another illustrative embodiment of the present invention, an NCD may further comprise a software program that may be executing on a host computer. This software program may cause the host computer to store a replacement firmware image. Typically, the replacement firmware image is stored on computer readable media that the host computer may normally access. According to another alternative embodiment, an NCD may further comprise a firmware update server program that may be executed on a host computer. Another illustrative embodiment of the present invention further comprises an update server installation software program that may be executed on a host computer. This software program may cause the host computer to install the firmware update server program on the host. The host computer may then execute the firmware update server, enabling the host to respond to a request for a replacement firmware image.

According to one alternative embodiment of an NCD that is processor based, the NCD may further comprises a firmware loader instruction sequence stored in the permanent memory and a host interface. Accordingly, the processor may execute the firmware loader instruction sequence.

The firmware loader instruction sequence minimally causes the processor to send a request to a firmware update server using the host interface and to receive a replacement firmware image through the interface. In alternative example embodiment, an NCD may further comprise a network interface. In this instance, a firmware loader instruction sequence comprising the invention may be executed by the processor and may minimally cause the processor to interrogate the network interface in order to discover a host that is communicatively connected to the network interface. Once a host is discovered, a request for a replacement firmware image may be dispatched by the processor to the host. The processor may then receive a replacement firmware image through the network interface. Once a replacement firmware image has been received, it may be stored in the semi-permanent memory comprising the NCD.

BRIEF DESCRIPTION OF THE DRAWINGS

The foregoing aspects are better understood from the following detailed description of one embodiment of the invention with reference to the drawings, in which.

The components in the figures are not necessarily to scale, emphasis instead being placed upon illustrating the principles of the invention. In the figures, like reference numerals designate corresponding parts throughout the different views.

DETAILED DESCRIPTION OF THE INVENTION

An NCD may comprise any apparatus that may be used to connect one network to another. For instance, a network connection device may comprise a modem, including, but not limited to dial-up modems, cable modems, digital subscriber line (DSL) modems, wireless modem and the like. The scope of the present invention is also intended to include all means of connecting a subscriber to a wide array network.

Figure 1:
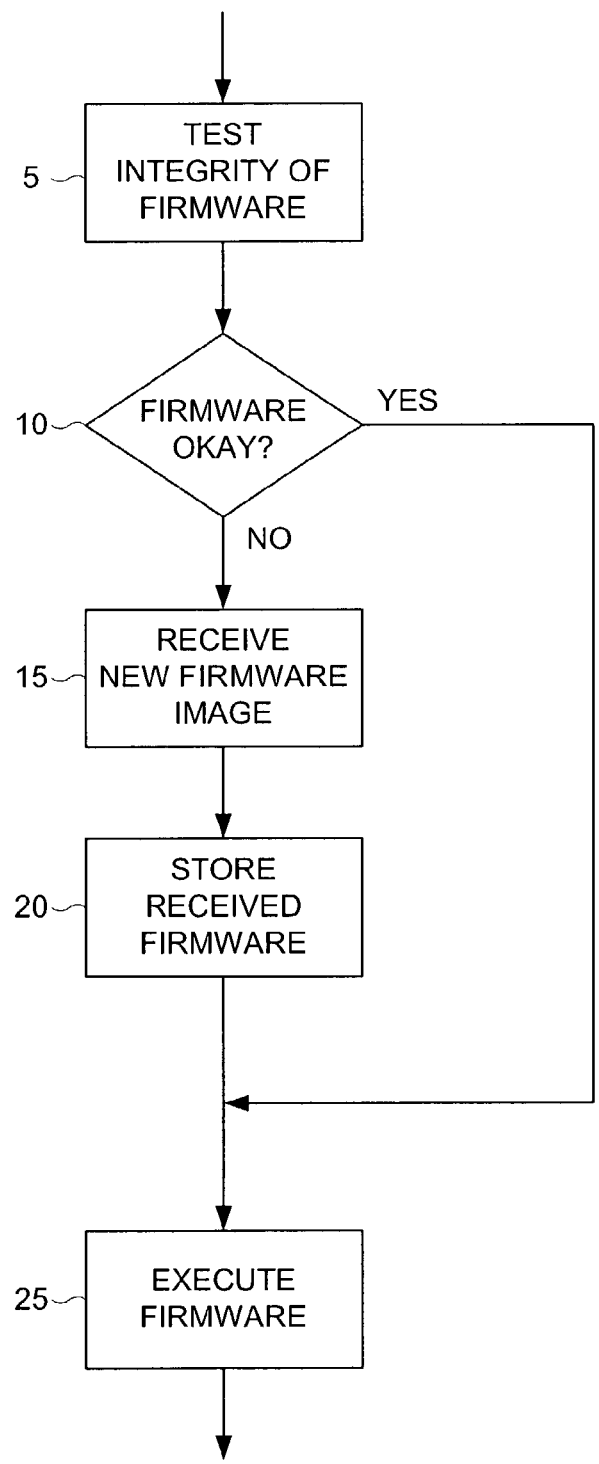
FIG. 1 is a flow diagram that illustrates one example method of restoring firmware in a network connection device (NCD) according to the present invention.

FIG. 1 is a flow diagram that illustrates one example method of restoring firmware in a network connection device (NCD) according to the present invention. In this illustrative method, the integrity of the firmware may be tested (step 5). If the test verifies the integrity of the firmware, then the firmware may be executed (step 25). If the test finds the firmware to be corrupted, then a new firmware image may be received (step 15) and may be stored into a semi-permanent memory (step 20) so that it may be executed (step 25).

In one derivative method of restoring firmware according to the present invention, a replacement firmware image may be stored on a host. By storing a replacement firmware image on a host, a source for new firmware image retrieval may be provided. In order to respond to a request for a new firmware image that may be received from an NCD, one derivative method provides for installation of a firmware server on the host. As the firmware server executes, it may then respond to a request for a new firmware image by retrieving the firmware image stored on the host and directing it the NCD in response to such a request.

Figure 2:
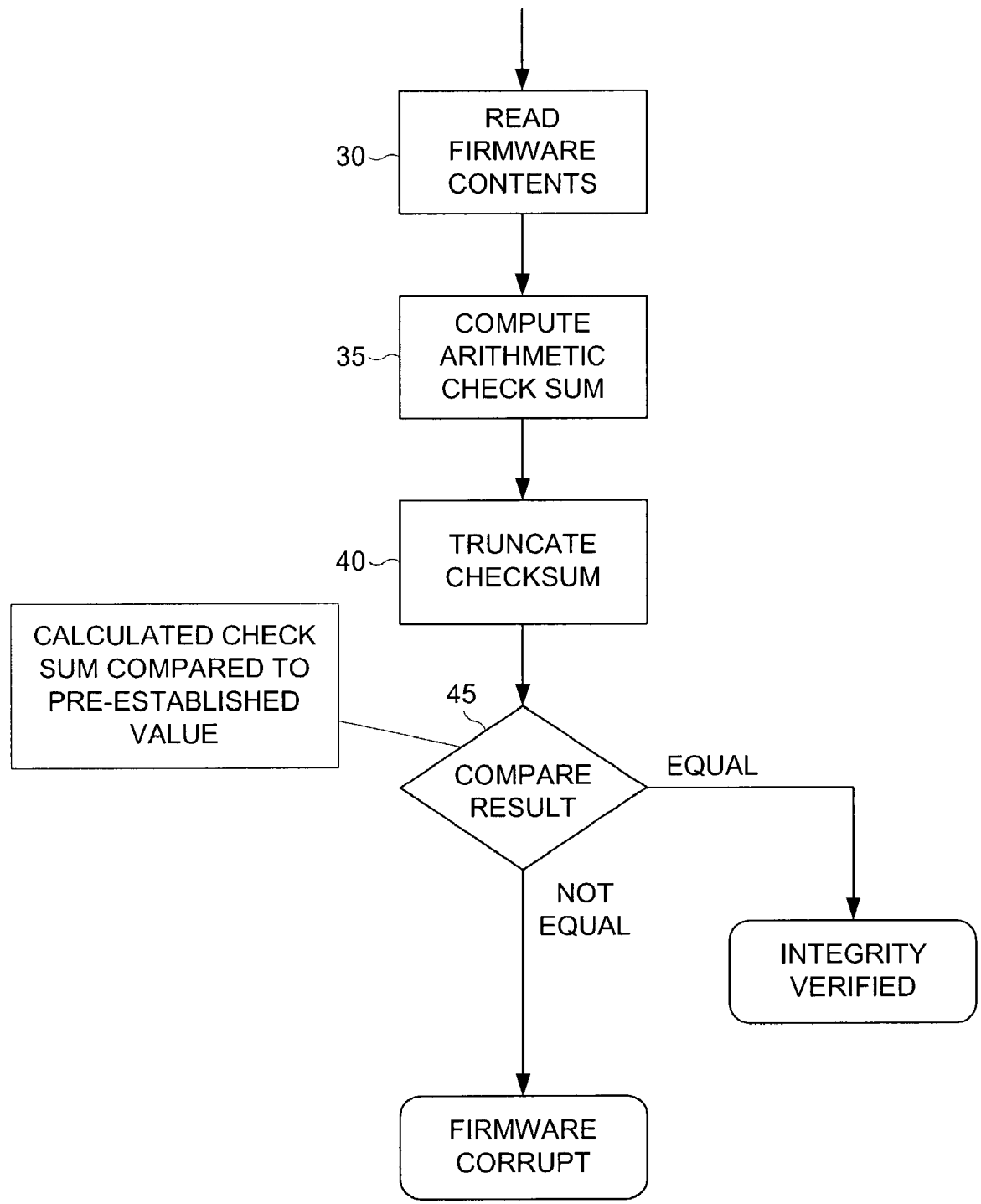
FIG. 2 is a flow diagram that illustrates a possible method of testing firmware integrity according to the present invention.

FIG. 2 is a flow diagram that illustrates a possible method of testing firmware integrity according to the present invention. Generally, a firmware image may be stored in a semi-permanent memory as a sequence of M−1 equal-length binary integers, each comprised of n binary digits. As an example, the integers may be stored in locations in semi-permanent memory that may be numbered as 0, 1, . . . , M−2. According to this method the firmware contents may be read (step 30), and a value of the arithmetic sum of the M−1 integers may be computed (step 35). The value of the sum may be truncated by retaining only the n least significant digits of the sum (step 40). This result may be called a "check sum". As a further refinement of this method, the value of this sum may be computed in advance and stored, for example, in location M−1 of the semi-permanent memory as a pre-established value for the check sum. A test of any particular firmware image according to this method may comprise calculating the check sum of the integers in locations 0, 1, . . . , M−2 for that firmware image and comparing the result to the pre-established value stored in the semi-permanent memory location M−1 (step 45). If the two values are equal, then the integrity of the firmware image may be verified with very high confidence. If the values are not equal, then it is almost certain that the firmware image has been corrupted.

In other variations of this illustrative method, a check sum may be calculated differently. An alternative check sum method may employ a cyclic redundancy check (CRC) as an alternative to the truncated arithmetic sum in the variation of the illustrative method just described. The two example methods herein described are intended to be illustrative and should not be used to limit the scope of the present invention.

Figure 3:
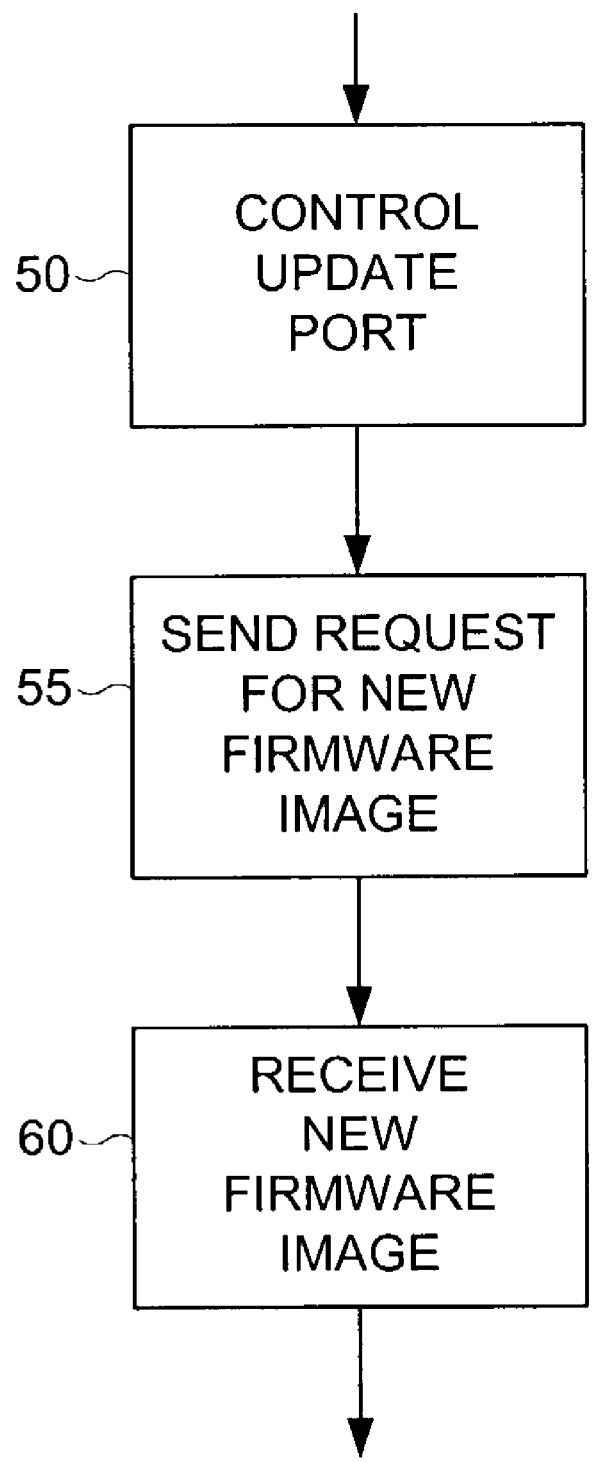
FIG. 3 is a flow diagram that depicts one example method for receiving a new firmware image through a update port according to the present invention.

FIG. 3 is a flow diagram that depicts one example method for receiving a new firmware image through a update port according to the present invention. According to this example method, control may be asserted (step 50) over a port to the support of an update function, said port communicatively attached to a host. When a request is transmitted over this port (step 55), a new firmware image may be received over the port (step 60). In some variations of this method, the port may comprise a USB port, and receiving the new firmware image may be facilitated by a USB cable that is connected between the NCD and the host. It is the intent of this description to include any appropriate type of port and the scope of the present method is not intended to be limited to any one type of update port.

Figure 4:
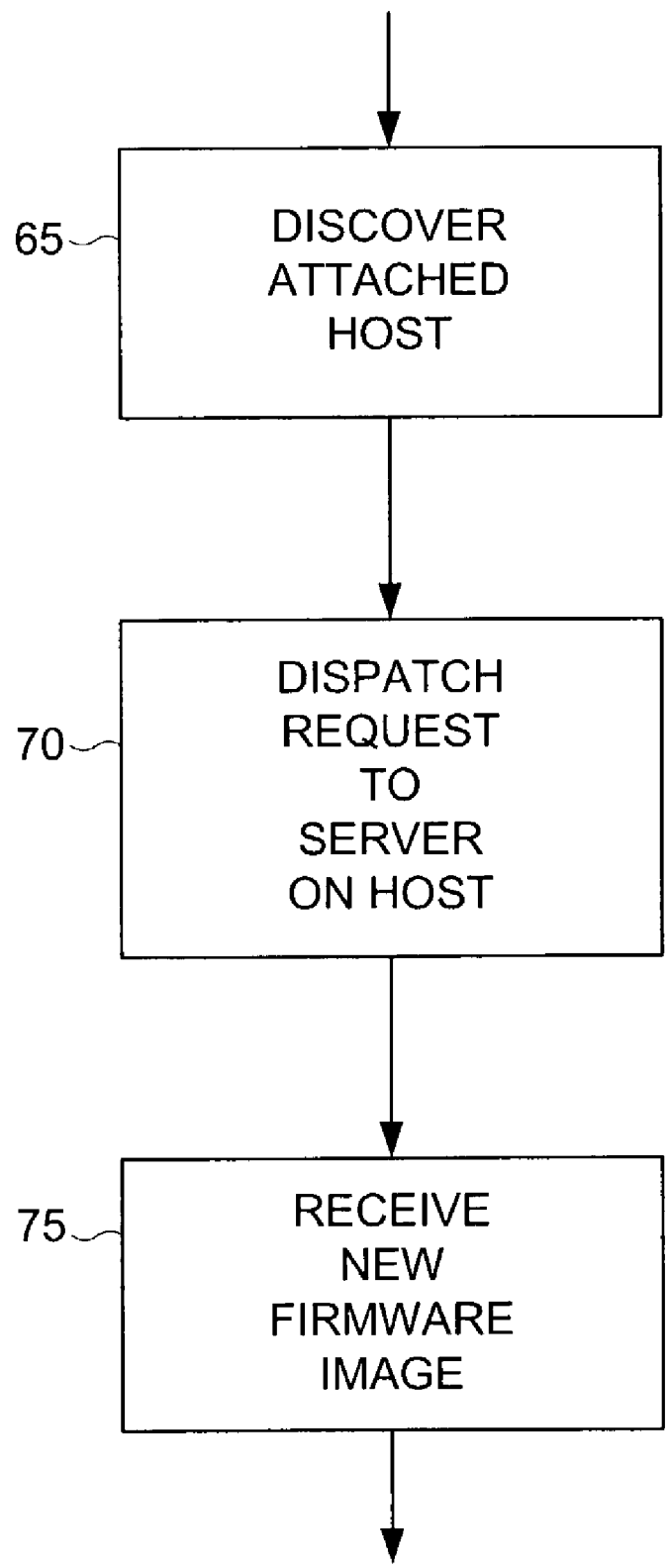
FIG. 4 is a flow diagram that depicts an alternative illustrative method for receiving a new firmware image through a network access interface according to the present invention.

FIG. 4 is a flow diagram that depicts an alternative illustrative method for receiving a new firmware image through a network access interface according to the present invention. In this alternative method, an NCD may employ a network protocol such as TCP/IP to discover a host (step 65) attached to the network connection device by means of a network access interface. Once the host is discovered the NCD may dispatch a request (step 70) to the host. The request may be received by a firmware update server that may execute on the host. A new firmware image may be received (step 75) by way of the network access interface in response to the request. According to one illustrative variation of the present method, the NCD may engage in a client-server session with the update server executing on the host using known protocols, for example TCP/IP. Using the client-server session, the NCD may then request and receive a new firmware image from the host. It should be noted that any suitable network protocol may be used to establish a client-sever session between the NCD and the host and the scope of the present invention is not intended to be limited to the one example network protocol cited here.

Figure 5:
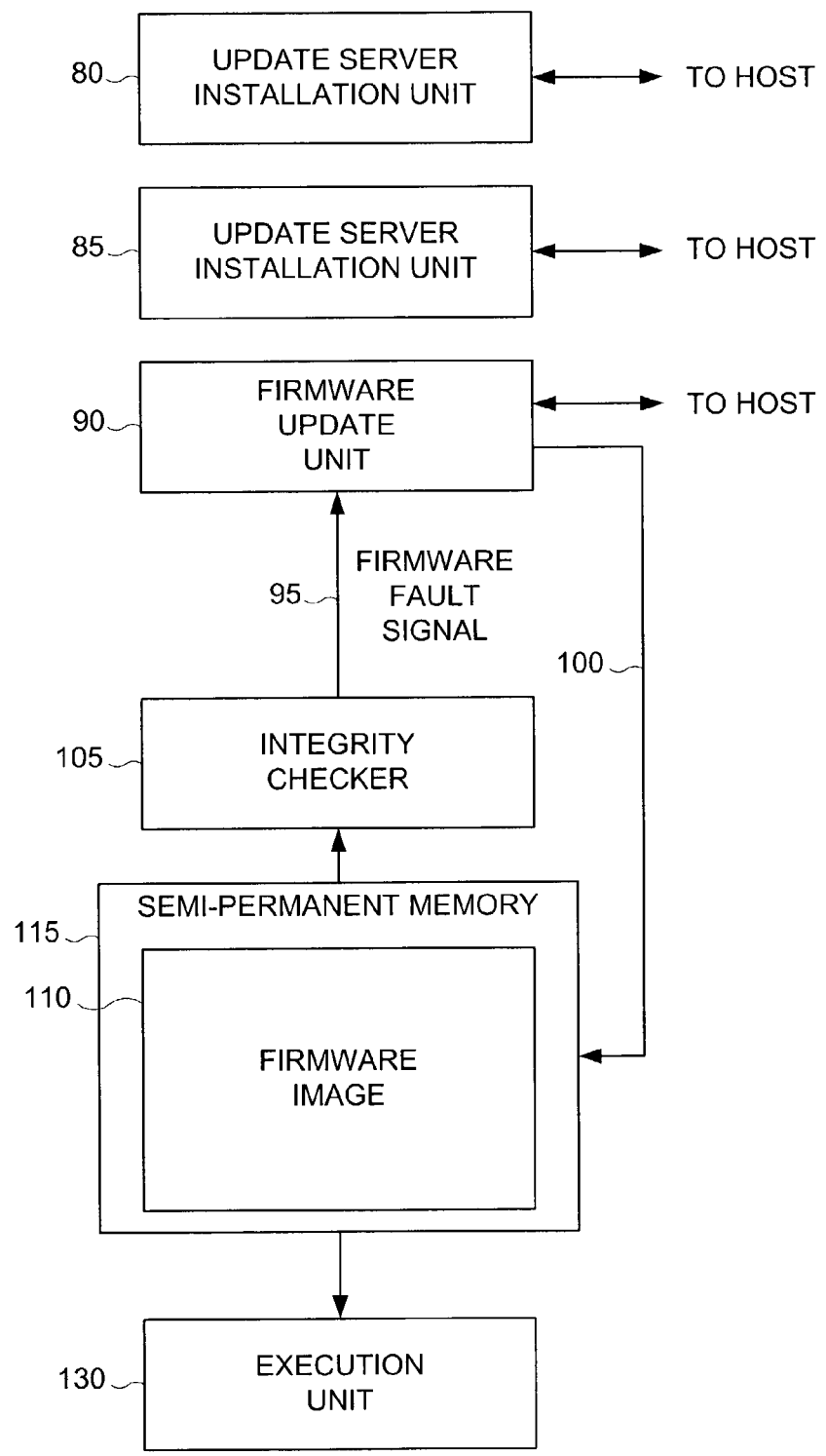
FIG. 5 is a block diagram of one example of an NCD that restores firmware according to the present invention.

FIG. 5 is a block diagram of one example of an NCD that restores firmware according to the present invention. An NCD, according to this example embodiment, may comprise a firmware integrity checking unit 105. This may implement a check sum process for testing the integrity of firmware 110 that may be stored in a semi-permanent memory 115. The firmware integrity checking unit 105 may assert a firmware fault signal 95 if the firmware is found to be corrupted. The NCD further may comprise a firmware update unit 90. When the firmware fault signal 95 is asserted, the firmware update unit 90 may receive a replacement firmware image from a host and may store the replacement image into the semi-permanent memory 115.

This example embodiment still further may comprise an execution unit 130 that may execute the firmware 115 if the firmware fault signal 95 is not active. In the event that firmware integrity is verified, then the firmware fault signal 95 may not be asserted. If the firmware update unit 90 stores a replacement version of firmware into semi-permanent memory 115, said firmware may become a new firmware image 110.

According to one embodiment of the invention, the integrity checker 105 optionally may initiate a new check of the firmware 110. If, at the conclusion of the check, the firmware fault signal 95 is not asserted, normal operation of the execution unit 130 may proceed by reading valid instruction sequences from the verified firmware image 110.

In another embodiment that employs the method of the present invention, an NCD may further comprise a replacement firmware image initiation unit 85. According to one embodiment, the replacement firmware image initiation unit 85 may comprise a software program; i.e. a set of software instruction sequences that may be stored on computer readable media and that may be read and executed by a computer. When executed by a host computer, these software instruction sequences minimally may cause the host processor to install a replacement firmware image onto computer readable media that the host may then later retrieve.

In yet another embodiment whereby firmware may be restored according to the present invention, an NCD may further comprise an update server installation unit 80. In one instance, the update server installation unit 80 may comprise a set of software instruction sequences that reside on computer readable media and that may be read and executed by a host processor. These software instruction sequences minimally may cause the host processor to install a set of software instruction sequences that comprise an update server software module onto the host. The host may then execute the update server software. It should be understood that the examples described supra are for illustration only and do not limit the intended scope of the present invention.

Figure 6:
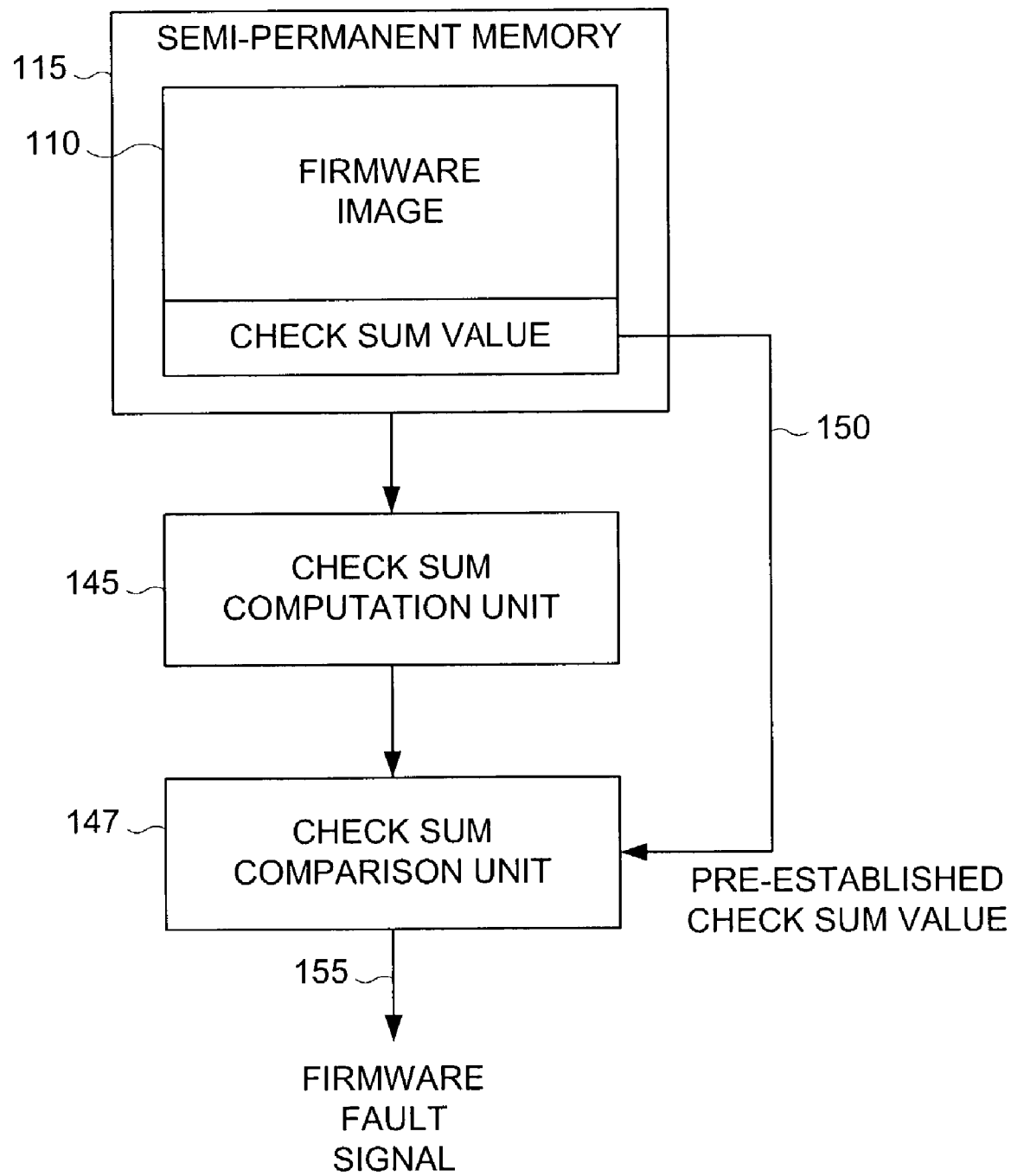
FIG. 6 is a block diagram of one embodiment of a firmware integrity checking device according to the present invention.

FIG. 6 is a block diagram of one embodiment of a firmware integrity checking device according to the present invention. According to this illustrative embodiment, a check sum computation unit 145 comprising the invention may read the contents of firmware 110 stored in a semi-permanent memory 115 and may calculate a check sum on the firmware. According to this illustrative embodiment, a firmware checking device may further comprise a comparator 147. A pre-established value 150 for firmware check sum may be acquired and compared by the comparator 147 with the computed value of the check sum. If these two values are equal, then the comparator 147 may set a firmware fault signal 155 to a non-asserted state. If the two values are not equal, then the comparator 147 may set the firmware fault signal 155 to an asserted state. In one embodiment of a device for testing firmware integrity, the pre-established value may be stored at a predetermined location in the semi-permanent memory 115.

Figure 7:
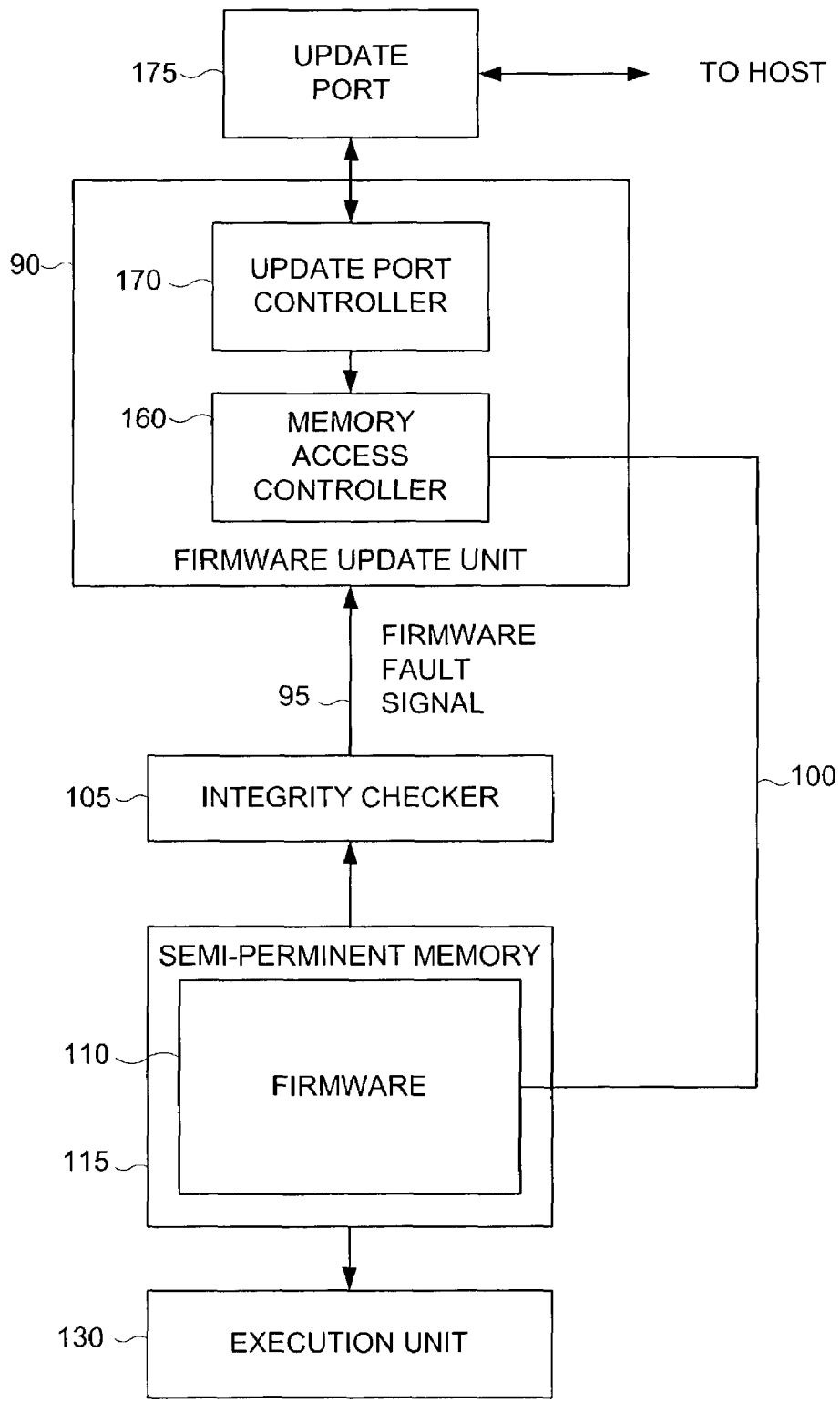
FIG. 7 is a block diagram of one illustrative embodiment of an NCD that may restore firmware by way of an update port according to the present invention.

FIG. 7 is a block diagram of one illustrative embodiment of an NCD that may restore firmware by way of an update port according to the present invention. This example embodiment comprises a firmware integrity checker 105 that may read firmware 110 that may be stored in semi-permanent memory 115 and that may assert a firmware fault signal 95 if the firmware is found to be corrupted. This embodiment further may comprise a firmware update unit 90 and an update port 175. The firmware update unit 90 may comprise an update port controller 170 and a memory access controller 160. The update port controller 170 may control the update port 175. In response to an asserted firmware fault signal 95, the update port controller 170 may send a request to a host by way of the update port 175.

In response, a replacement firmware image may be received by way of the update port 175 and directed to the memory access controller 160. The memory access controller 160 may store the replacement firmware image into semi-permanent memory 115. In some embodiments, the integrity checker 95 may repeat the test of firmware integrity. If firmware integrity is verified, then the firmware fault signal 95 may not be asserted. In this case, an execution unit 130 further comprising the invention may execute the firmware 110 either directly from the semi-permanent memory 115 or the firmware 110 may be copied into RAM and executed from there.

Figure 8:
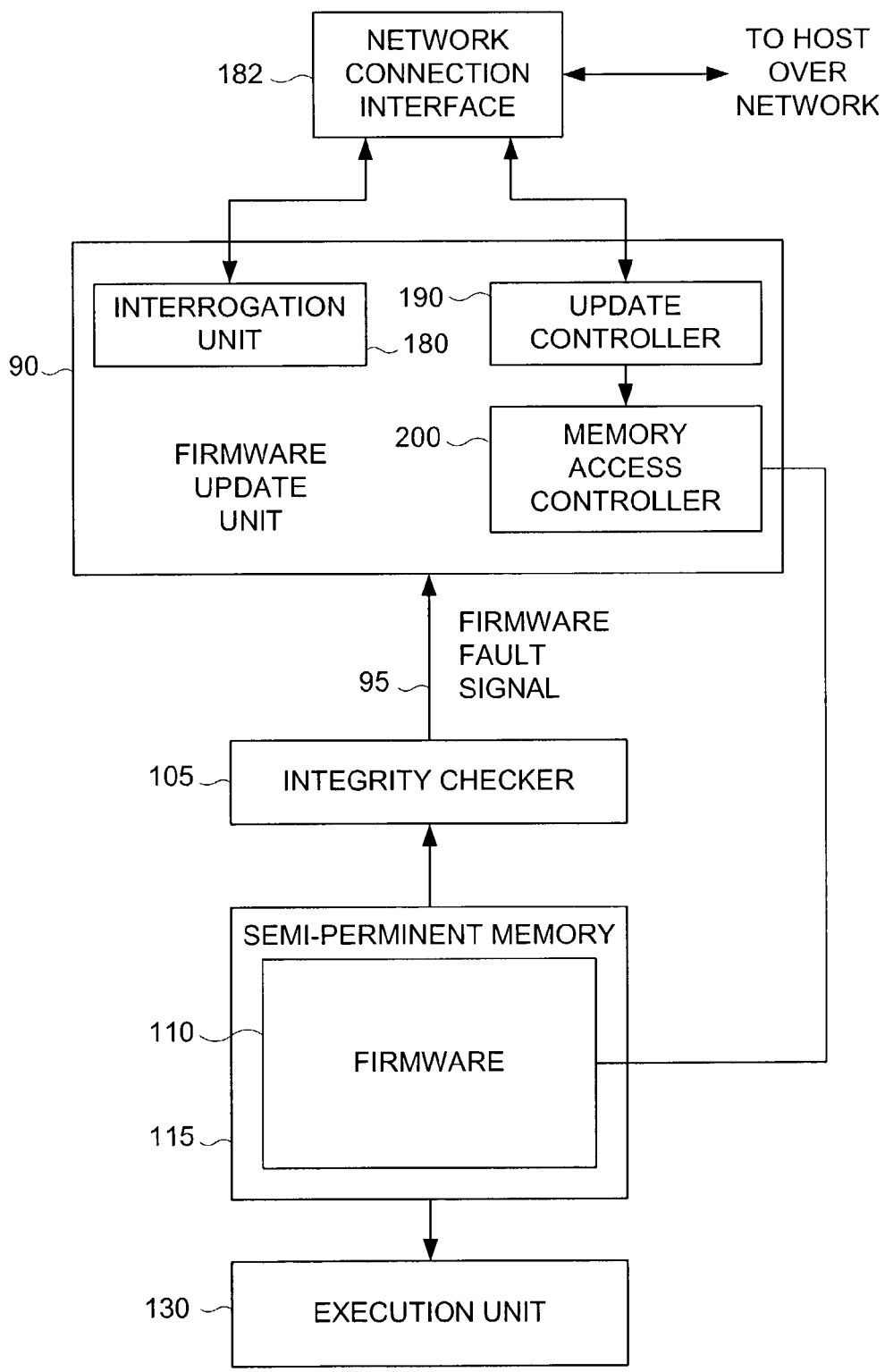
FIG. 8 is a block diagram of one example embodiment of an NCD that may restore firmware by way of a network connection according to the present invention.

FIG. 8 is a block diagram of one example embodiment of an NCD that may restore firmware by way of a network connection according to the present invention. According to this example embodiment, a firmware integrity checker 105 comprising the invention may read firmware 110 that may be stored in semi-permanent memory 115 and may assert a firmware fault signal 95 if the firmware is found to be corrupted. This embodiment further may comprise a network connection interface 182 by means of which the NCD may communicate with a host over a network. This example embodiment may further comprise a firmware update unit 90 that comprises a network interrogation unit 180, a firmware update controller 190 and a memory access controller 200. If the firmware fault signal 95 is asserted, then the network interrogation unit 180 may search by means of the network connection interface 182 for a host that is communicatively connected to the NCD. If a host is found, then the network interrogation unit 180 may provide a network address to the firmware update controller 190. The firmware update controller 190 then may send a request to a host by way of the network connection interface 182 using the network address provided by the interrogation unit 180. In response to the request, the update controller 190 may receive a replacement firmware image by way of the network connection interface 182. The firmware update controller 190 then may transfer the replacement firmware image to the memory access controller 200. The memory access controller 200 may then store the replacement firmware image into semi-permanent memory 115.

Figure 9:
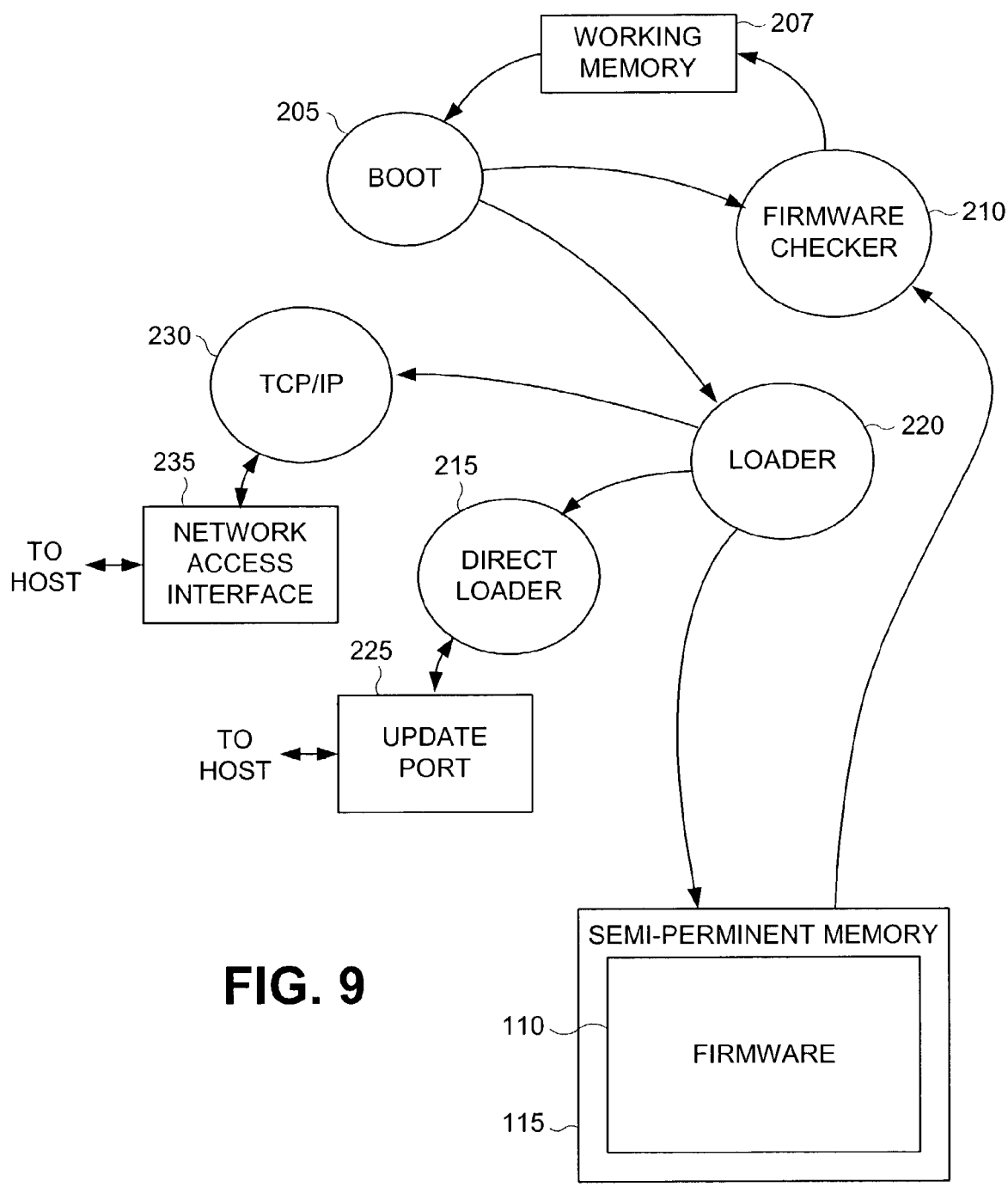
FIG. 9 is a data flow diagram that illustrates how a replacement firmware image is received in an NCD according to the present invention.

FIG. 9 is a data flow diagram that illustrates how a replacement firmware image is received in an NCD according to the present invention. Most embodiments of an NCD are processor-based apparatus. Accordingly, a processing device comprising the invention may execute sequences of instructions that together comprise a software program that may be executed by the processing device. This software program is known as firmware once it is stored in non-volatile memory comprising the apparatus.

One illustrative embodiment of an NCD comprises firmware comprising a boot module 205, a firmware checker module 210 and a loader module 220. One alternative embodiment of the invention further comprises a direct loader module 215. In yet another alternative embodiment of the invention, the firmware further comprises a network protocol module. The network protocol module may be a TCP/IP module 230. Various alternative embodiments further may comprise interface ports that, optionally, may comprise an update port 225 and a network port 235. These may be used to retrieve replacement firmware that may be stored as a firmware image 245 in semi-permanent memory 240 further comprising the invention.

The processing device may commence execution of the boot module 205 immediately after power is applied to the NCD or in response to any of several events that may initiate a power-on reset of the NCD. The boot module 205 may cause the processor to execute the firmware checker 210. The firmware checker module 210 may cause the processor to read the firmware 240 stored in semi-permanent memory 245 and compute a check sum on the firmware. If the firmware is found to be corrupt, then the firmware checker module 210 may cause the processor to set a firmwareCorrupt flag in a working memory 207 that can be later read when the processor continues to execute the boot module 205. The boot module 205 may cause the processor to examine the state of the firmwareCorrupt flag and, if the flag is set, transfer control to the loader module 220.

According to one alternative embodiment of the invention, the loader module 220 may cause the processor to initiate reception of replacement firmware by transferring control to the direct loader module 215 that may communicate with an attached host through an update port 225, thereby receiving a replacement firmware image. The loader module 220 may then cause the processor to store the replacement firmware image 245 into semi-permanent memory 240 and return control to the boot module 205.

In an alternative embodiment of an NCD, the loader module 220 may cause the processor to initiate an update of the firmware by transferring control to the TCP/IP module 230. This network protocol module may enable the processor to communicate with a host through the network port 235, thereby receiving a replacement firmware image. The loader module 220 may cause the processor to store the replacement firmware image 245 into semi-permanent memory 240 and return control to the boot module 205. Typically, the loader module 220 minimally causes the processor to engage in a client-server session with a firmware server. It should be noted that any suitable network protocol may be used and the scope of the present invention is not intended to be limited to any one particular illustrative example introduced here.

Figure 10:
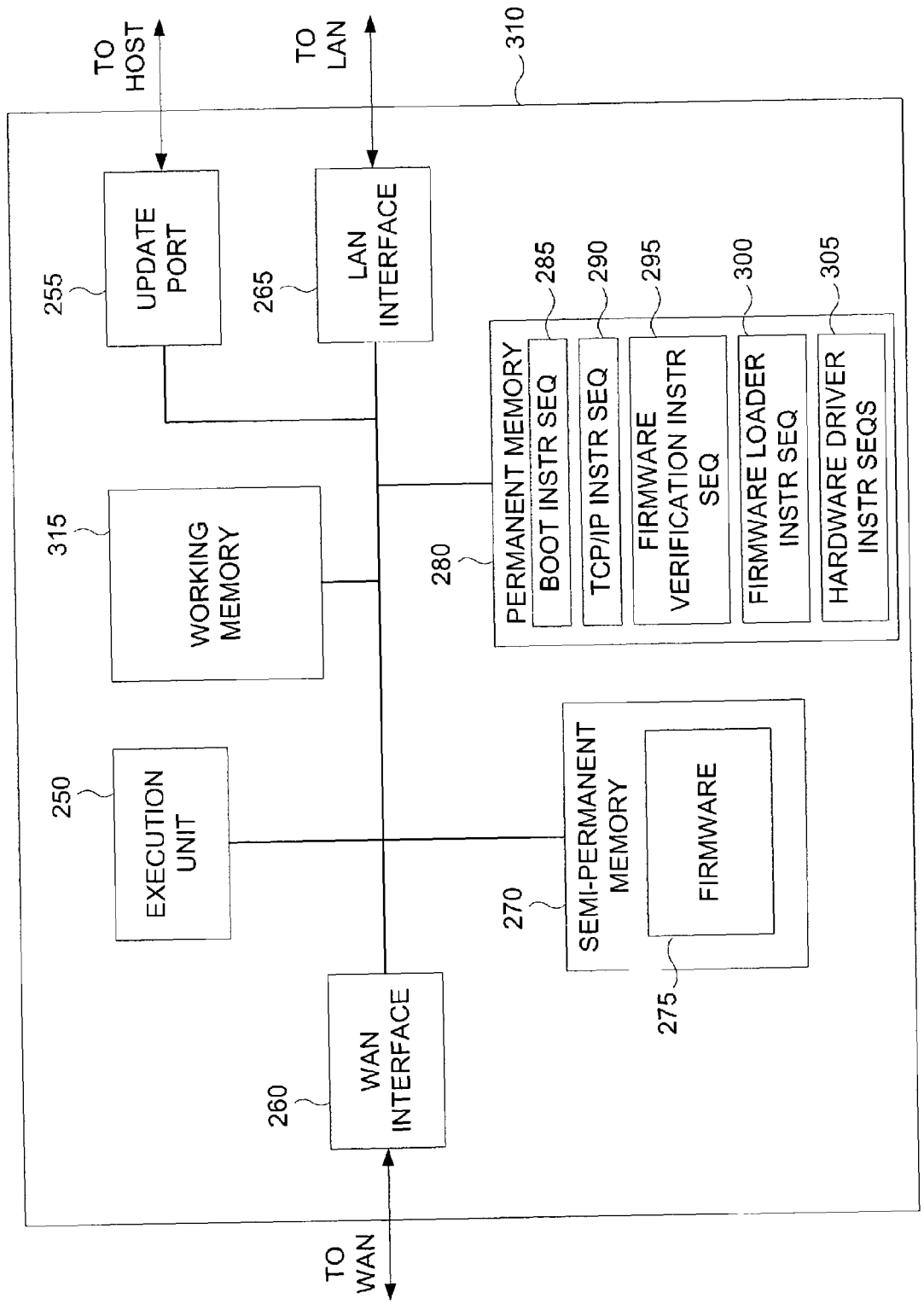
FIG. 10 is a block diagram that illustrates one example embodiment of a processor-based NCD that may restore firmware according to the present invention.

FIG. 10 is a block diagram that illustrates one example embodiment of a processor-based NCD that may restore firmware according to the present invention. According to this embodiment, an NCD 310 may comprise a wide-area network (WAN) interface 260, by means of which it may communicate with a WAN; and a local area network (LAN) interface 265 by means of which it may communicate with a LAN. The NCD thus may be interposed between a WAN and a LAN. The LAN may comprise a plurality of interconnected network devices including, but not restricted to, home networking devices, hubs, switches, PCs, set top boxes, home appliances, home entertainment devices, telephones, fax machines, copiers, scanners, and similar types of home and office devices that may reside on a network. The LAN interface may be alternatively used to connect the NCD to a single computer. In typical implementations, the WAN may comprise the Internet or a private intranet.

An NCD 310 according to this example embodiment further may comprise an execution unit 250 that may execute instruction sequences, semi-permanent memory 270 in which may be stored firmware 275 and permanent memory in which may be stored a boot instruction sequence 285. A network protocol instruction sequence, which may be a TCP/IP instruction sequence 290, a firmware verification instruction sequence 295, a firmware loader instruction sequence 300, and a plurality of hardware driver instruction sequences 305 comprising an update port driver instruction sequence, a WAN interface driver instruction sequence and a LAN interface driver instruction sequence. The NCD 310 further may comprise an update port 255.

According to one example mode of operation of the NCD 310 that implements the teachings of the present invention, the execution unit may commence operation immediately after power is applied to the NCD 310 by executing the boot instruction sequence 285. The boot instruction sequence 285 minimally may cause the execution unit 250 to test the integrity of firmware 300 stored in the semi-permanent memory by executing the firmware verification instruction sequence 295 that may cause the execution unit 250 to verify the integrity of firmware 300 according to the teachings of the present invention.

The firmware verification instruction sequence 295 may cause the execution unit 250 to store a firmwareCorrupt flag into working memory 315, said flag representing the fidelity of firmware stored in the semi-permanent memory 270 as determined by the execution unit 250 through execution of the firmware verification instruction sequence 295. The boot instruction sequence 285 then may cause the execution unit 250 to interrogate the firmwareCorrupt flag and, if the flag is set, may cause the execution unit 250 to execute the firmware loader instruction sequence 300 that may initiate reception of replacement firmware by causing the execution unit 250 to execute the update port driver instruction sequence and thereby to receive a replacement firmware image by way of the update port 280. The firmware loader instruction sequence 300 then may cause the execution unit 250 to store the replacement firmware image into the semi-permanent memory 270. The boot instruction sequence 285 then may cause the execution unit 250 to execute the firmware 275 stored in the semi-permanent memory 270.

In one optional mode of operation of the NCD 310 the firmware loader instruction sequence 300 may initiate reception of replacement firmware by minimally causing the execution unit 250 to execute the LAN interface driver instruction sequence and thereby to receive a replacement firmware image by way of the LAN interface 265.

Another embodiment of the NCD 310 may comprise a host interface comprising the update port driver instruction sequence and the update port 280 whereby the execution unit 250 may communicate with a host. In this embodiment the firmware loader instruction sequence 300 may cause the execution unit 250 to send a request to a firmware update server through the host interface and to receive a replacement firmware image through the host interface.

In yet another embodiment of the NCD 310 the firmware loader instruction sequence 300 minimally may cause the execution unit 250 to execute the TCP/IP instruction sequence 290 whereby the execution unit 250 may send interrogation messages to the LAN through the LAN interface 265 and to receive through the LAN interface 265 a host address from a host on the LAN. The firmware loader instruction sequence 300 then may cause the execution unit 250 further to execute the TCP/IP instruction sequence 290 whereby the execution unit 250 may send a request through the LAN interface to an update server directed to the host address of the host. The TCP/IP instruction sequence 290 then may cause the execution unit 250 to receive a replacement firmware image through the LAN interface 265.

Figure 11:
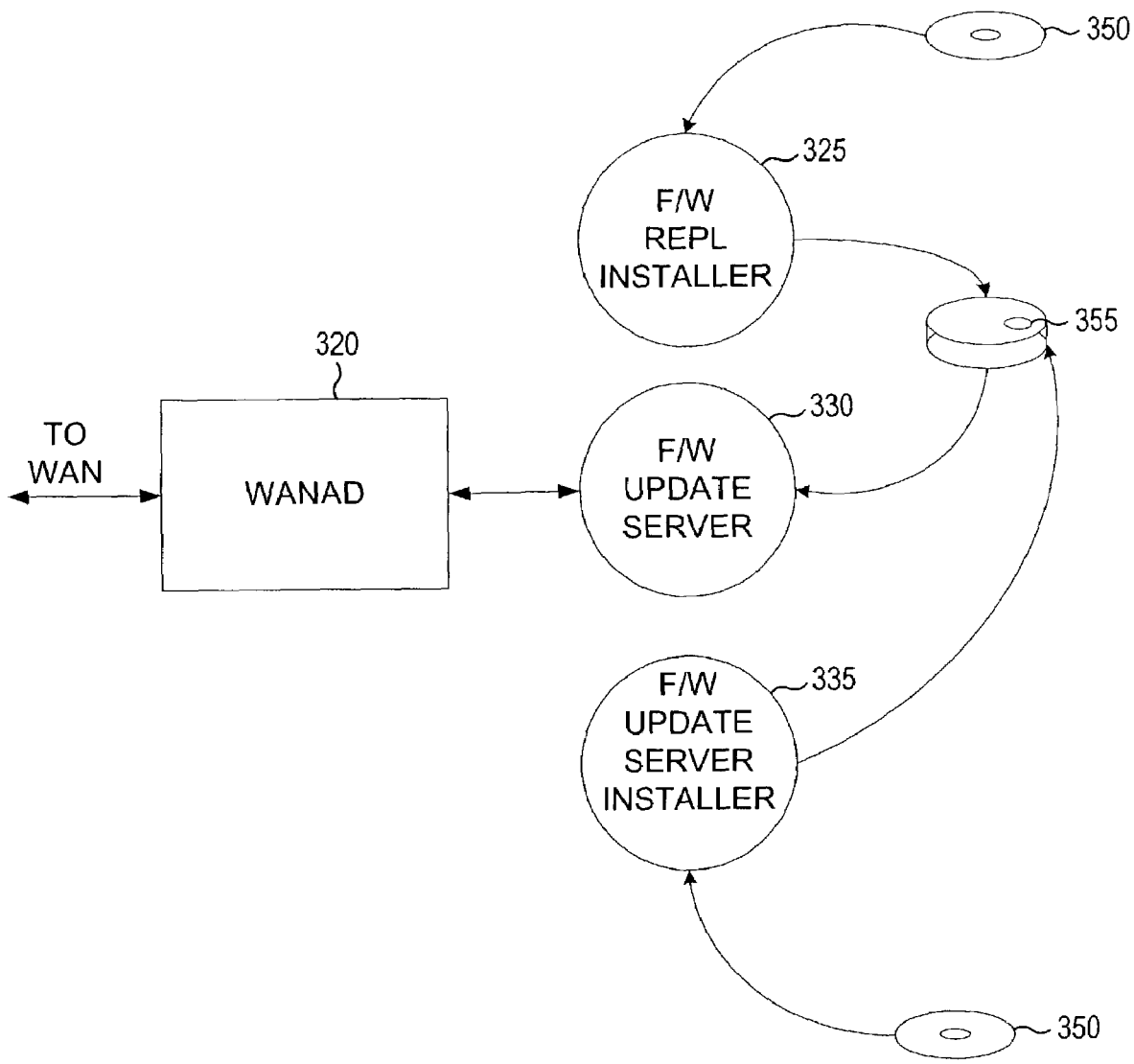
FIG. 11 is a data flow diagram that depicts an example process for initializing a host computer according to the present invention.

FIG. 11 is a data flow diagram that depicts an example process for initializing a host computer according to the present invention. According to one alternative embodiment of the invention, an NCD may further comprise a software program for initializing a host computer. A software program may comprise a set of sequences of instructions that, when executed by a computer, may implement a function. The function may be called a module. Generally, the software program for initializing a host computer is executed by the host computer.

In one example embodiment, an NCD may comprise a wide area network access device (WANAD) 320 and a firmware update server module 330 that may be executed by a host computer enabling the host computer to respond to requests from a requester for replacement firmware images. The requester may be the WANAD 320. The host may comprise computer readable media 340, for example a hard drive, wherein one or more replacement firmware images 355 may be stored. When the host computer executes the firmware update server module 330, it may receive a request from a requester and may retrieve a replacement firmware image 355 from computer readable media 340 and may direct the replacement image to the requester.

In another example embodiment, an NCD further may comprise a firmware replacement installer module 325. The firmware installer module 325 may be executed by the host computer causing it to access a removable computer readable media 350, for example a CD ROM, wherein may be stored a replacement firmware image. By further executing the firmware replacement installer module 325, the host computer may read the replacement firmware image from the removable computer readable media 350 and store the replacement firmware image on a computer readable media 340 that is normally always accessible by the host computer, for example a hard disk.

In yet another example embodiment, an NCD further may comprise a firmware update server installer module 335. The firmware update server installer module 335 may cause the host computer to access a removable computer readable media 345, for example a CD ROM, wherein may be stored a firmware update server module. The firmware update server installer module 335 may then cause the host computer to read the firmware update server module from the removable computer readable media 345 and to install the firmware update server module 330 into the host. Subsequently the firmware update server module 330 may be executed by the host computer enabling it to receive and to respond to a request for a replacement image from a requester according to the teachings of the present invention.

ALTERNATIVE EMBODIMENTS

While this invention has been described in terms of several preferred embodiments, it is contemplated that alternatives, modifications, permutations, and equivalents thereof will become apparent to those skilled in the art upon a reading of the specification and study of the drawings. It is therefore intended that the true spirit and scope of the present invention include all such alternatives, modifications, permutations, and equivalents.

Further, while various embodiments of the invention have been described, it will be apparent to those of ordinary skill in the art that many more embodiments and implementations are possible that are within the scope of this invention.

What is claimed is:

1. A network connection device comprising:
   a network connection interface for communicatively connecting the network connection device to a host;
   firmware integrity checker capable of testing the integrity of network connection device firmware stored in a semi-permanent memory and generating a firmware fault signal if the firmware is found to be corrupt;
   firmware update unit capable of receiving a replacement network connection device firmware image from a local host and storing said image into the semi-permanent memory when it receives an active firmware fault signal and wherein the firmware update unit includes a network interrogation unit capable of searching for a firmware update server communicatively connected to the network connection device by way of the network connection interface;
   execution unit capable of executing the firmware stored in the semi-permanent memory if the firmware fault signal is not active; and
   a computer readable medium accessible by the host having imparted thereon an instruction sequence that, when executed by the host, minimally causes the host to store a replacement firmware image on the host.

2. The network connection device of claim 1 further comprising a computer readable medium accessible by the host having imparted thereon an instruction sequence that, when executed by the host, minimally causes the host to install a firmware update server on the host.

3. The network connection device of claim 1 wherein the firmware integrity checker comprises:
   check sum computation unit capable of generating a check sum according to the firmware stored in semi-permanent memory; and
   comparison unit that capable of generating a firmware fault signal if the generated check sum does not equal a pre-established value.

4. The network connection device of claim 1 wherein the firmware update unit
- is capable of sending a request to a firmware update server by way of the network connection interface and receiving a replacement firmware image by way of the network connection interface in response to the request if the firmware fault signal is active; and
- memory access controller capable of receiving the replacement firmware image from the network connection interface and storing said image in the semi-permanent memory.

5. A network connection device comprising:

processor;

network interface for communicating with a host computer;

permanent memory for storing instruction sequences;

firmware loader instruction sequence stored in the permanent memory that, when executed by the processor, minimally causes the processor to discover a local host attached to the network interface;

semi-permanent memory for storing network connection device firmware; and firmware verification instruction sequence stored in permanent memory wherein the firmware verification sequence, when executed by the processor, minimally causes the processor to:
- test the integrity of firmware stored in the semi-permanent memory;
- receive a replacement firmware image from the local host if the firmware is found to be corrupt;
- store the replacement firmware image in the semi-permanent memory; and
- execute the firmware stored in the semi-permanent memory; and computer readable medium accessible by the host having imparted thereon a software program that, when executed on the host, stores a replacement firmware image on the host.

6. The network connection device of claim 5 further comprising a computer readable medium accessible by the host having imparted thereon a software program that, when executed on the host, installs a firmware update server on the host.

7. The network connection device of claim 5 further comprising a computer readable medium accessible by the host having imparted thereon a
- firmware update server software program that, when executed on a host, responds to requests from a requester for replacement firmware images by retrieving a replacement firmware image stored on the host and directing the replacement image to the requester.

8. The network connection device of claim 5
- wherein the firmware loader instruction sequence minimally causes the processor to:
  - send interrogation messages to the network interface;
  - receive a host address for a host communicatively connected to the network interface;
  - send a request to an update server directed to the host address of the host; and
  - receive a replacement firmware image through the network interface.

* * * * *